(12) United States Patent
Yoshikawa

(10) Patent No.: US 8,890,769 B2
(45) Date of Patent: Nov. 18, 2014

(54) DISPLAY SYSTEM AND CONTROL METHOD

(75) Inventor: Jouji Yoshikawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 193 days.

(21) Appl. No.: 13/498,669

(22) PCT Filed: Sep. 28, 2010

(86) PCT No.: PCT/JP2010/066816
§ 371 (c)(1),
(2), (4) Date: Mar. 28, 2012

(87) PCT Pub. No.: WO2011/037253
PCT Pub. Date: Mar. 31, 2011

(65) Prior Publication Data
US 2012/0182203 A1    Jul. 19, 2012

(30) Foreign Application Priority Data

Sep. 28, 2009 (JP) .................. 2009-223507

(51) Int. Cl.
*G09G 5/00*  (2006.01)
*G06F 3/14*  (2006.01)

(52) U.S. Cl.
CPC ............. *G60F 3/04817* (2013.01); *G06F 3/14* (2013.01)
USPC ......................................................... 345/1.3

(58) Field of Classification Search
None
See application file for complete search history.

(56) References Cited

U.S. PATENT DOCUMENTS 6,191,807 B1   2/2001  Hamada et al.
2006/0070001 A1   3/2006  Liu et al.

FOREIGN PATENT DOCUMENTS

| JP | 7336659 A | 12/1995 |
|---|---|---|
| JP | 2002281468 A | 9/2002 |
| JP | 2006119629 A | 5/2006 |
| JP | 2007086616 A | 4/2007 |
| JP | 2007096542 A | 4/2007 |

OTHER PUBLICATIONS

International Search Report and Written Opinion for PCT/JP2010/066816 dated Dec. 14, 2010.
Office Action mailed Aug. 6, 2013 corresponds to Japanese patent application No. 2009-223507, for which an explanation of relevance is attached.

*Primary Examiner* — Joseph Feild
*Assistant Examiner* — Parul Gupta
(74) *Attorney, Agent, or Firm* — Lowe Hauptman & Ham, LLP

(57) ABSTRACT

According to an aspect, a display system includes a first display unit, a second display unit, an operating unit, and a control unit. The second display unit is provided with a first icon arranged thereon. The operating unit detects an operation. When an operation of moving the first icon to a first area on the second display unit is detected by the operating unit, the control unit displays a first image associated with the first icon on the first display unit and in a second area on the second display unit.

16 Claims, 11 Drawing Sheets

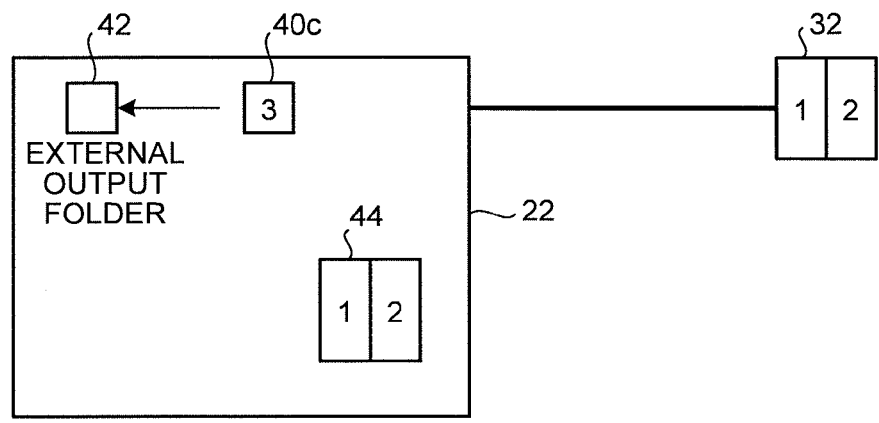
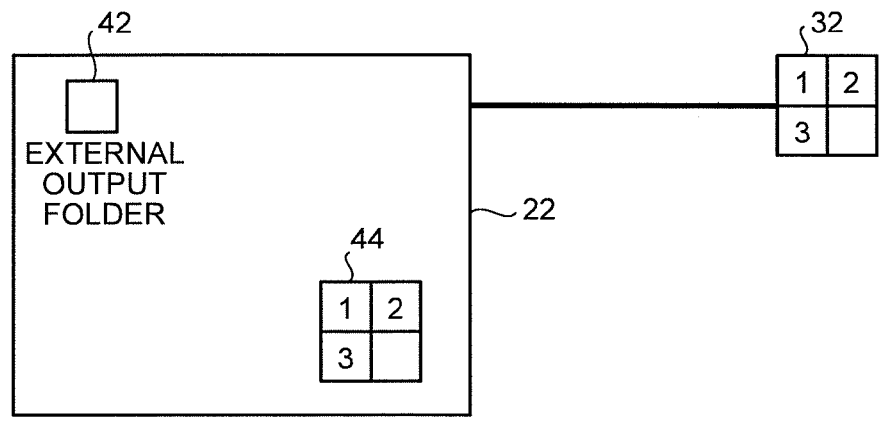

DISPLAY SYSTEM AND CONTROL METHOD

CROSS-REFERENCE TO RELATED APPLICATION

This application is a National Stage of PCT international application Ser. No. PCT/JP2010/066816 filed on Sep. 28, 2010 which designates the United States, and which is based upon and claims the benefit of priority from Japanese Patent Application No. 2009-223507, filed on Sep. 28, 2009.

FIELD

The present disclosure relates to a display system and a control method capable of causing a plurality of display units to display images.

BACKGROUND

Conventionally, a display system, such as a personal computer (PC) or a mobile phone, that causes an image to be displayed has a function of, while displaying an image on its liquid crystal display unit, causing a projector or another display system to also display an image. As electronic device, an apparatus that includes two display units and that can display images on the two display units is also provided.

Mobile projectors that include two display units, which are a liquid crystal display unit and a projector unit, and are compact and easy carrying have also been proposed in recent years. For example, described in Patent Literature 1 is a mobile terminal, which has a projector function, that includes an upper cabinet, a lower cabinet, and a hinge unit that pivotally connects the upper cabinet and the lower cabinet to each other, and that is equipped with a projector that includes a lens and a light source. This mobile terminal includes a liquid crystal display device provided on the upper cabinet.

CITATION LIST

Patent Literature

Patent Literature 1: Japanese Patent Application Laid-open No. 2007-96542

Technical Problem

The configuration that includes two display units is used in some cases in a manner that an operator performs operation while viewing a screen of one display unit and a viewer enjoys viewing a screen on the other display unit. For cases where two display units are used in such a manner, there are a method of displaying a same image on the two display units and a method of displaying different images on the two display units.

First, when the same image is displayed on two display units, by performing operation while viewing the screen of one of the display units, the operator can check a screen appearing on the screen of the other display unit. In this method, however, because the same image is displayed on the both display units, how the screen is operated by the operator is seen by the viewer. For example, a search screen on which the operator is searching for a file to be displayed next is seen by the viewer, and a secret document or the like displayed on the screen is also seen thereby.

Next, when different images are displayed on two display units, it is necessary to control images to be displayed on the respective display units. In this case, the operator can view the image on one display unit to which an operation is input, of the screens of the two display units, but cannot check the content displayed on the other display unit under the situation where the operator cannot view the other display unit. Therefore, there is a problem that it is difficult for the operator to operate the images to be displayed on the two display units.

For the foregoing reasons, there is a need for a display system that allows an operator to perform operations on images easily even if different images are displayed on the two display units.

SUMMARY

According to an aspect, a display system includes: a first display unit for displaying a first image; a second display unit for displaying a second image including a file icon associated with image information and a folder icon displayed in an area different from that of the file icon before the first image is displayed on the first display unit; an operating unit for operating a display position of at least one of the file icon and the folder icon in the second display unit; and a control unit for controlling the first display unit and the second display unit. The control unit displays, when an operation to move at least one of the file icon and the folder icon so as to overlap each other is input to the operating unit, an image of the image information associated with the file icon on the first display unit.

According to another aspect, the control unit activates an application function corresponding to a file type of the file icon to generate the image from the image information associated with the file icon by the activated application function.

According to another aspect, the control unit displays, when it is determined that there is a plurality of application functions corresponding to the file type of the file icon, application icons corresponding to the plurality of application functions around the folder icon, and the control unit activates, when an operation to select one application icon from the plurality of application icons is detected, the one application function to generate the image from the image information associated with the file icon by the activated application function.

According to another aspect, the operation for the selection is an operation to move the one application icon, of the plurality of application icons, onto the folder icon.

According to another aspect, the control unit displays, when the first image is displayed on the first display unit, a same image as the image displayed on the first display unit in part of the second display unit.

According to another aspect, the control unit displays the same image as the image displayed on the first display unit inside of an area of the second display unit where the folder icon is displayed.

According to another aspect, the control unit displays the same image as the image displayed on the first display unit in an area of the second display unit different from the area where the folder icon is displayed.

According to another aspect, the control unit displays, when an instruction to display images associated with a plurality of file icons is input through the operating unit, the images associated with the plurality of file icons, as thumbnail images, on the first display unit.

According to another aspect, the display system further includes an external storage device provided with a storage unit that stores therein information. The control unit acquires, when the image information is stored in the external storage device, the image information from the storage unit of the external storage device, displays the image on the display unit, and stores the image information in the storage unit.

According to another aspect, the display system includes a first display device that includes the first display unit; and a second display device that includes the second display unit, the control unit, and the operating unit. The first display device is removably attached to the second display device.

According to another aspect, the first display unit displays an image by projecting the image.

Advantageous Effects of Invention

The display system according to the present invention is capable of displaying, only by moving a file displayed on a display unit, an image on the other display unit. Therefore, there are such effects that the operator can operate display images by a simple operation and operability can thereby be improved.

BRIEF DESCRIPTION OF DRAWINGS

FIG. 5 is an explanatory diagram for explaining an image displayed on the display system.

FIG. 6 is an explanatory diagram for explaining an image displayed on the display system.

DESCRIPTION OF EMBODIMENTS

The present invention will be explained in detail below with reference to the drawings. It should be noted that the present invention is not limited by the following explanation. In addition, the components in the explanation below include those which are easily thought of by persons skilled in the art, those which are substantially equivalents, and those in a scope of so-called equivalents. The display system is explained below using a system in which a personal computer and a mobile electronic device (mobile phone) are connected to each other through a communication line as an example, however, a target to which the present invention is applied is not limited thereto. For example, the present invention can also be used for a system in which a personal computer and a projector are connected to each other through a communication line, and for a system in which two mobile electronic devices such as a mobile phone including a display unit are connected to each other. Moreover, the present invention is not limited to a connection between a plurality of devices through a communication line, and can therefore be used for a single device including a display panel and a projector function, a device including two display panels, and the like. The mobile electronic device is not limited to a mobile phone, and, therefore, examples of the mobile electronic device includes devices provided with at least one display unit, such as, PHSs (Personal Handy-phone Systems), PDAs (Personal Digital Assistants), portable navigation devices, notebook computers, and gaming devices.

Figure 1:
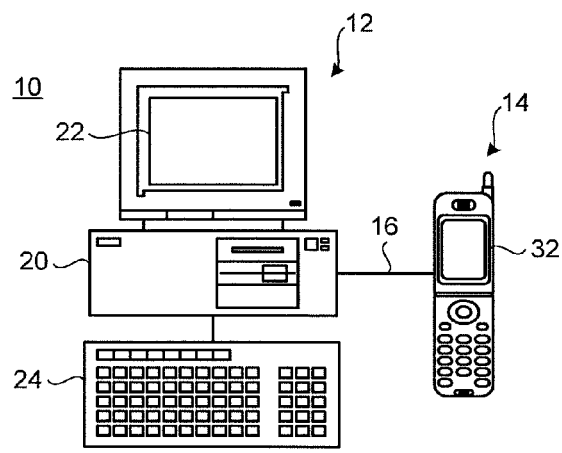
FIG. 1 is a schematic diagram illustrating a schematic configuration of an embodiment of a display system.
Figure 2:
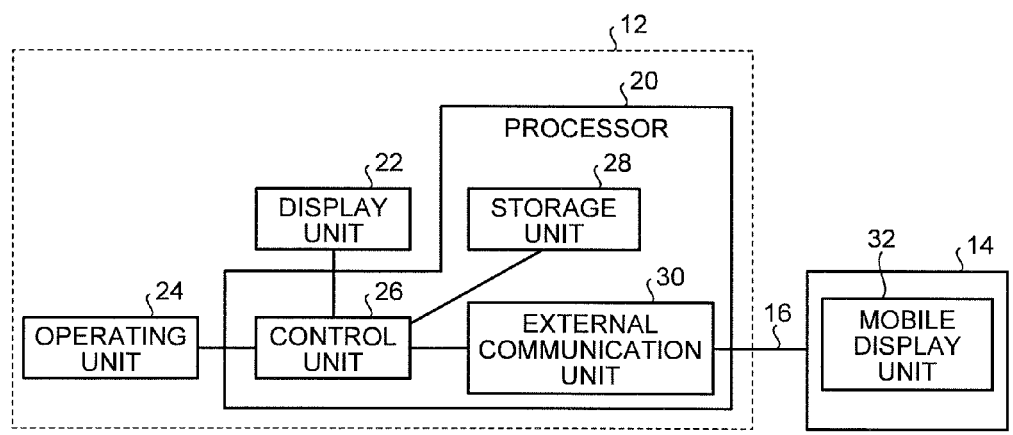
FIG. 2 is a block diagram illustrating the schematic configuration of the display system illustrated in FIG. 1.

A device configuration of a display system 10 is explained below with reference to FIG. 1 and FIG. 2. FIG. 1 is a schematic diagram illustrating a schematic configuration of an embodiment of the display system, and FIG. 2 is a block diagram illustrating the schematic configuration of the display system of FIG. 1. As illustrated in FIG. 1, the display system 10 includes a personal computer (hereinafter, "PC") 12, a mobile electronic device 14, and a communication line 16. Each of the devices is explained below.

First, the personal computer (PC) 12 includes a processor 20, a display unit 22 that displays an image, and an operating unit 24 through which an instruction is input by the operator. The PC 12 also includes, in addition to the above units, generally provided various types of components as the PC, for example, a storage medium reader (CD drive, DVD drive, and USB terminal), a sound output unit, and a sound input unit. The processor 20 includes a control unit 26 that controls operations of the units, a storage unit 28 that stores therein various pieces of information, and an external communication unit 30 that performs transmission/reception of information to/from other device.

The control unit 26 is processing unit such as a CPU (Central Processing Unit) that integrally controls an entire operation of the PC 12 and the display system 10. That is, the control unit 26 controls the operations of the display unit 22, the external communication unit 30, and the like so that various processes of the display system 10 are executed in an appropriate procedure according to an operation of the operating unit 24 and software stored in the storage unit 28 of the processor 20.

The control unit 26 executes the processes based on program(s) (e.g., an operating system program and application programs) stored in the storage unit 28. The control unit 26 includes, for example, a micro processor unit (MPU), and executes various processes of the PC 12 and the display system 10 according to the procedure instructed by the software. That is, the control unit 26 sequentially reads instruction codes from the operating system program, the application programs, and the like stored in the storage unit 28 and executes the processes.

The control unit 26 has a function of executing a plurality of application programs. The application program executed by the control unit 26 includes a plurality of application programs such as image reproduction an application program for reproducing a still image and a moving image, an application program for controlling an image to be displayed on the display unit 22 based on the operation of the operating unit 24 and image information to be sent to the mobile electronic device 14 through the external communication unit 30, and game application programs for activating various games.

The storage unit 28 stores therein software and data used for the processes performed by the control unit 26. The storage unit 28 also stores therein a task for activating the application program for controlling the drive of the projector, a task for activating the image reproduction application programs for reproducing a still image and a moving image, and a task for activating the various game application programs.

The storage unit 28 stores therein, in addition to these tasks, for example, data obtained through communication or download, software used by the control unit 26 to control the storage unit 28, and temporary data used by processing processes of the software. The computer programs and the temporary data used in the processing processes of the software are temporarily stored in a work area allocated to the storage unit 28 by the control unit 26. The storage unit 28 includes, for example, a nonvolatile storage device (e.g., nonvolatile semiconductor memory such as ROM: Read Only Memory, and a hard disk drive, etc.), and a readable/writable storage device (e.g., SRAM: Static Random Access Memory, and DRAM: Dynamic Random Access Memory). A position where the storage unit 28 is disposed is not particularly limited, and may therefore be disposed inside the personal computer 12. The storage unit 28 may be disposed in an external hard disk, an external server, or the like, as an external storage device. The storage unit 28 may be a part of the storage unit of the mobile electronic device 14, and in this case, the mobile electronic device 14 is used as the external storage device.

The external communication unit 30 performs transmission/reception of information to/from other device through wired or wireless communication line. For example, when the wireless communication is performed, the external communication unit 30 performs transmission/reception of information to/from other device through wireless LAN (Local Area Network) or infrared communication, while when the wired communication is performed, the external communication unit 30 performs transmission/reception of information to/from other device using a communication cable such as an electric wire and an optical fiber cable. The external communication unit 30 includes a connection terminal for connecting to a wired or wireless communication line. As the connection terminal, in the case of wireless communication, a wireless device or an infrared port can be used, and in the case of wired communication, a port (USB (Universal Serial Bus) port or LAN port) to which a communication line (cable) is connected can be used.

The display unit 22 is provided with a display panel including a liquid crystal display (LCD), an organic EL (Organic Electro-Luminescence) panel, or the like, and displays a video according to video data and an image according to image data supplied from the control unit 26 on the display panel.

The operating unit 24 includes a keyboard including input keys such as numeric keys, character keys, direction keys, and a decision key. When any key of the keyboard is input through a user's operation, the operating unit 24 generates a signal corresponding to the detail of the operation. The generated signal is input to the control unit 26 as an instruction of the user. The operating unit 24 is not limited to the keyboard, and therefore a pointing device such as a mouse and a joystick can also be used. A touch panel can also be used, in which a device capable of detecting a contact is provided on the surface of the display unit 22 and which detects an input by a user's operation based on information displayed on the display unit 22 and a contact position on the display unit 22. The PC 12 is configured in the above manner.

The mobile electronic device 14 is a mobile phone provided with a wireless communication function and a wired communication function. The mobile electronic device 14 is a mobile phone that stores components in a foldable housing with two members coupled to each other by a hinge. According to the present embodiment, the housing is the foldable type; however, it may be a one box type housing, or a housing with two members which are slidable. A housing connected with three or more members can also be used.

The mobile electronic device 14 is provided with a mobile display unit 32 (hereinafter, also referred to as "mobile display unit") as a display unit illustrated in FIG. 1 and FIG. 2. The mobile display unit 32 displays, as a predetermined image, a standby image when the mobile electronic device 14 is in a standby state for reception and a menu image used to help operation for the mobile electronic device 14. The mobile display unit 32 displays an image of an image signal supplied from the PC 12 through the communication line 16.

The mobile electronic device 14 includes a connection terminal for connecting to the communication line 16. The above-mentioned various connection terminals can be used as the connection terminal. The mobile electronic device 14 is connected to the PC 12 only through the communication line 16, and therefore can be disconnected from the PC 12 by removing the communication line 16 therefrom. That is, the mobile electronic device 14 is removably attached to the PC 12. The mobile electronic device 14 also includes various functions required as a mobile phone, in addition to the mobile display unit 32. As one example, the mobile electronic device 14 includes a transmitter/receiver that performs communication with a base station or the like to perform telephone communication, an operating unit to which the operator inputs an operation, and a sound processor that converts sound input through a microphone to a signal and generates sound output from a receiver or a speaker, and the like. The mobile electronic device 14 may include, in addition to the phone call function, various functions (applications) such as a mail function and a sound reproduction function.

The communication line 16 is a cable for connecting the external communication unit 30 of the PC 12 and the mobile electronic device 14, and through which information (signal) transmitted from the external communication unit 30 is sent to the mobile electronic device 14 and information (signal) transmitted from the mobile electronic device 14 is sent to the external communication unit 30. As the cable, a coaxial cable, an optical fiber cable, and a like can be used. When wireless communication is performed between the PC 12 and the mobile electronic device 14, infrared rays, electric waves, or the like function as the communication line 16.

Next, the operations of the display system 10 are explained with reference to FIG. 3 to FIG. 8. FIG. 3 to FIG. 8 are explanatory diagrams for explaining an image displayed on the display system. The control unit 26 of the PC 12 in the display system 10 controls an image to be displayed on the display unit 22 of the PC 12 and an image to be displayed on the mobile display unit 32 of the mobile electronic device 14, based on an instruction of the operator's operation input to the operating unit 24 or based on a preset instruction.

Figure 3:
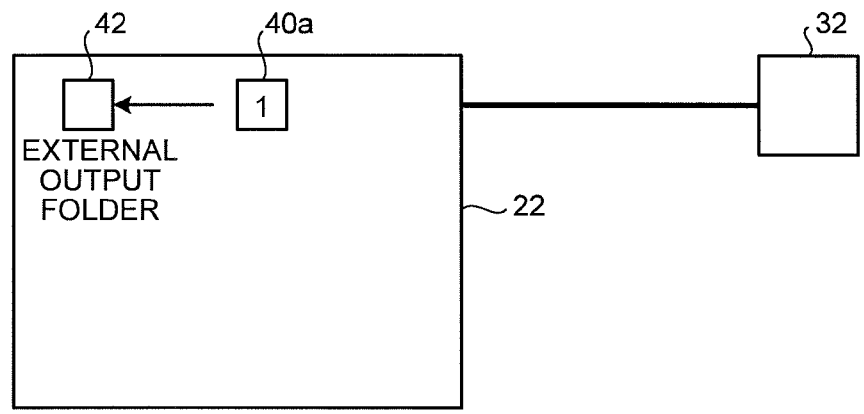
FIG. 3 is an explanatory diagram for explaining an image displayed on the display system.

First, as illustrated in FIG. 3, the display unit 22 displays thereon an external output folder 42 and a file icon (hereinafter, "icon") 40a, which is associated with an application or data (which is data itself for an image or so, or information used to acquire an image or so) for an image to be reproduced and displayed by a content, or the like. Displayed on the display unit 22 are various icons other than the icon 40a although they are not illustrated in the figure. The application includes text editing software, table editing software, image reproduction software, moving-image reproduction software, and the like that causes a screen to be displayed as an image associated the icon. The content is a software (data) to provide, when reproduced by a computer, movie, music, theater, photograph, comic, animation, computer game, a combination of text, graphic, color, sound, action, and/or images, or information related to these as an image associated the icon.

Figure 4:
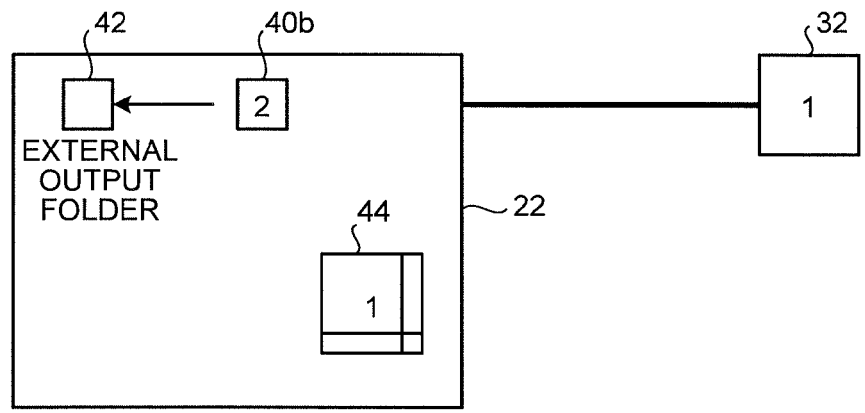
FIG. 4 is an explanatory diagram for explaining an image displayed on the display system.

In such a state as above, as illustrated in FIG. 3, the icon 40a is moved to a position where it overlaps an external output folder (folder icon) 42 by an operator's operation. For example, a mouse is used to specify the icon 40a to be moved to the external output folder 42 by drag-and-drop operation. When the icon 40a is moved to the position where it overlaps the external output folder 42, the control unit 26 determines that a still image or a moving image (hereinafter, also called simply "image") associated with the icon 40a as an image to be displayed on the mobile display unit 32, activates an application or a content to reproduce the still image or the moving image associated with the icon 40a, generates the still image or the moving image, and displays the image (image of "1" in FIG. 4) corresponding to the icon 40a on the mobile display unit 32 as illustrated in FIG. 4. The control unit 26 also displays the image associated with the icon 40a in a window (sub-screen) 44 of the display unit 22. If the image associated with the icon 40a is larger than a display area of the window 44, the control unit 26 displays only a portion of the image which is clipped by the window 44, and further set so that a display area of the image can be moved by a scroll bar. The size of an image may be enlarged or reduced according to the display area of the window 44.

Subsequently, as illustrated in FIG. 4, an icon 40b is moved to the position where it overlaps the external output folder 42 by an operator's operation. When the icon 40b is moved to the position where it overlaps the external output folder 42, the control unit 26 determines an image associated with the icon 40b as an image to be displayed on the mobile display unit 32, divides the display area of the mobile display unit 32 into two areas as illustrated in FIG. 5, and displays the image corresponding to the icon 40a and the image (image "2" in FIG. 5) corresponding to the icon 40b in the divided two areas, respectively. Likewise, the control unit 26 divides the window 44 into two areas, and displays the image corresponding to the icon 40a and the image corresponding to the icon 40b in the divided two areas. In this case, also, an application or a content to reproduce the image associated with the icon 40b is activated; however, if the application or the content is already activated, that is, if the image can be reproduced by the same application or content as that associated with the icon 40a, the activated application or content may be used.

Subsequently, as illustrated in FIG. 5, an icon 40c is moved to the position where it overlaps the external output folder 42 by an operator's operation. When the icon 40c is moved to the position where it overlaps the external output folder 42, the control unit 26 determines an image associated with the icon 40c as an image to be displayed on the mobile display unit 32, divides the display area of the mobile display unit 32 into four areas as illustrated in FIG. 6, and displays the image corresponding to the icon 40a, the image corresponding to the icon 40b, and the image (image "3" in FIG. 6) corresponding to the icon 40c in the divided areas, respectively. Likewise, the control unit 26 divides the window 44 into four areas, and displays the image corresponding to the icon 40a, the image corresponding to the icon 40b, and the image corresponding to the icon 40c in the divided areas, respectively. Nothing needs to be displayed in one area of the divided four areas; however, a predetermined image may be displayed therein after display of indication that the area is a blank space.

Figure 7:
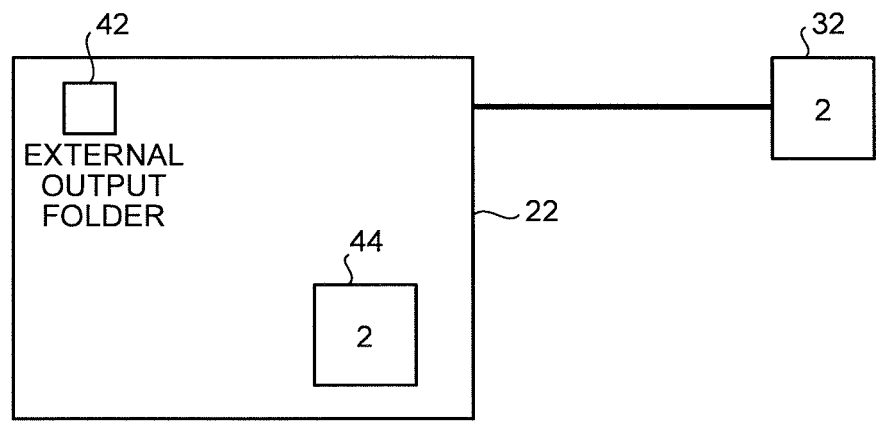
FIG. 7 is an explanatory diagram for explaining an image displayed on the display system.

When the operator inputs an instruction to select the image (image "2" in FIG. 6) corresponding to the icon 40b while the image corresponding to the icon 40a, the image corresponding to the icon 40b, and the image corresponding to the icon 40c are displayed in the three areas of the four divided areas of the mobile display unit 32 and the window 44 as illustrated in FIG. 6, the control unit 26 displays only the image (image "2" in FIG. 7) corresponding to the icon 40b on the mobile display unit 32 and the window 44, as illustrated in FIG. 7.

Figure 8:
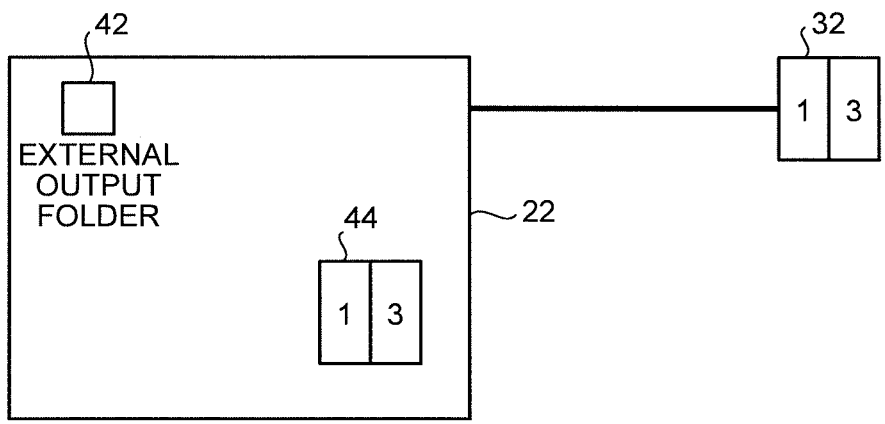
FIG. 8 is an explanatory diagram for explaining an image displayed on the display system.

When the operator performs an operation to end the display of the image corresponding to the icon 40b while the image corresponding to the icon 40a, the image corresponding to the icon 40b, and the image corresponding to the icon 40c are displayed in the three areas of the four divided areas of the mobile display unit 32 and the window 44 as illustrated in FIG. 6, or while only the image (image "2" in FIG. 6) corresponding to the icon 40b is displayed on the mobile display unit 32 and the window 44 as illustrated in FIG. 7, the control unit 26 divides the display area of the mobile display unit 32 into two areas and displays the image corresponding to the icon 40a and the image corresponding to the icon 40c in the divided two areas, as illustrated in FIG. 8. Likewise, the control unit 26 divides the window 44 into two areas and displays the image corresponding to the icon 40a and the image corresponding to the icon 40c in the divided areas. Examples of the operation to end the display of the image corresponding to the icon 40b include an operation in which the external output folder 42 is clicked (or double clicked) to display a list of files (images) or a list of contents and applications and an process for ending the image based on the icon 40b or an process for ending the content or the application for display is input from the list; and an operation to select the end from a sub-menu of the window 44; and an operation to drag and drop the displayed image so as to move the image to an area outside of the window 44.

As explained above, the display system 10 is configured to display an image on the mobile display unit 32 only by moving the icon, associated with the image desired to be displayed on the mobile display unit 32, to the external output folder 42. That is, a desired image can be displayed on the mobile display unit 32 only by movement of the icon by the operator. This does not require for the operator to perform processes such that he/she causes the image to be displayed and selects a process from a menu of the window where the image is displayed, thus simplifying the operator's operation.

The display system 10 displays the image associated with the icon moved to the external output folder 42 on the mobile display unit 32, and can thereby control the display of the mobile display unit 32 without displaying an operation screen displayed on the display unit 22 on the mobile display unit 32. Furthermore, the display system 10 displays the window 44 in a part of the screen of the display unit 22 and displays the image displayed on the mobile display unit 32 in the window 44, and the operator can thereby recognize the image displayed on the mobile display unit 32. That is, by displaying only part of the image displayed on the display unit 22 (one of the display units) on the mobile display unit 32 (the other display unit), the operator can recognize the image on the mobile display unit 32 and the image on the display unit 22 by viewing only the screen of the display unit 22. This enables the operator to adequately operate the images displayed on the both display units even when the operator cannot look at the image on the mobile display unit 32. In addition, the display system 10 is configured to display only part of the image displayed on the display unit 22 on the mobile display unit 32, so that the operator can cause an image, which should not be seen by the viewer of the mobile display unit 32 or an image not desired to be seen thereby, to be displayed in an area not displayed on the mobile display unit 32, that is, in an area outside of the window of the display unit 22. Thereby, while an image for presentation is displayed on the mobile display unit 32, its descriptive text or draft can be displayed on the display unit 22. This also allows the operator to search for a next image to be displayed on the mobile display unit 32 while causing an image to be displayed on the mobile display unit 32. Therefore, the images can be displayed on the two display units, the display unit 22 and the mobile display unit 32, while improving the operator's operability.

Figure 9:
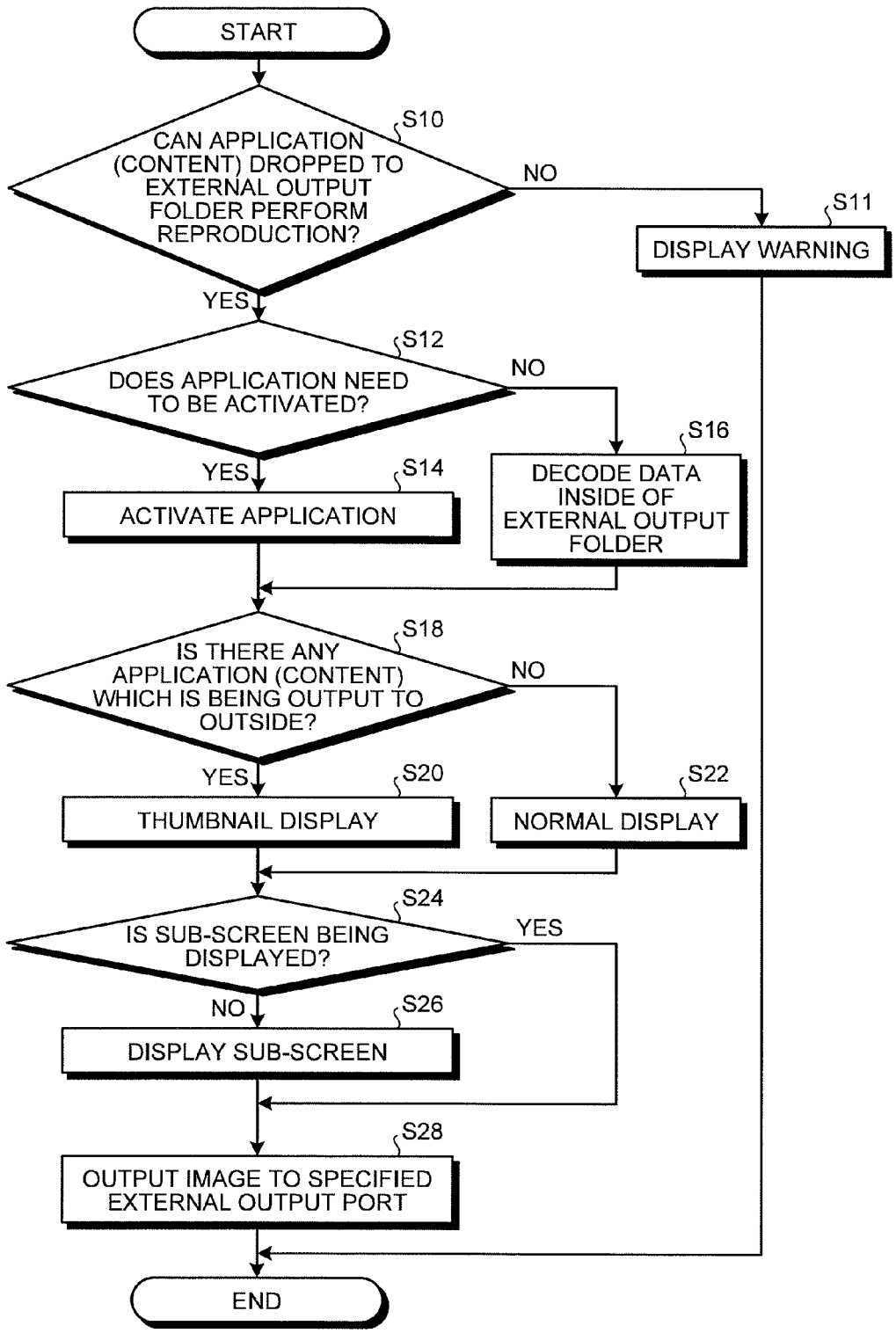
FIG. 9 is a flowchart illustrating one example of an operation of the display system.
Figure 10:
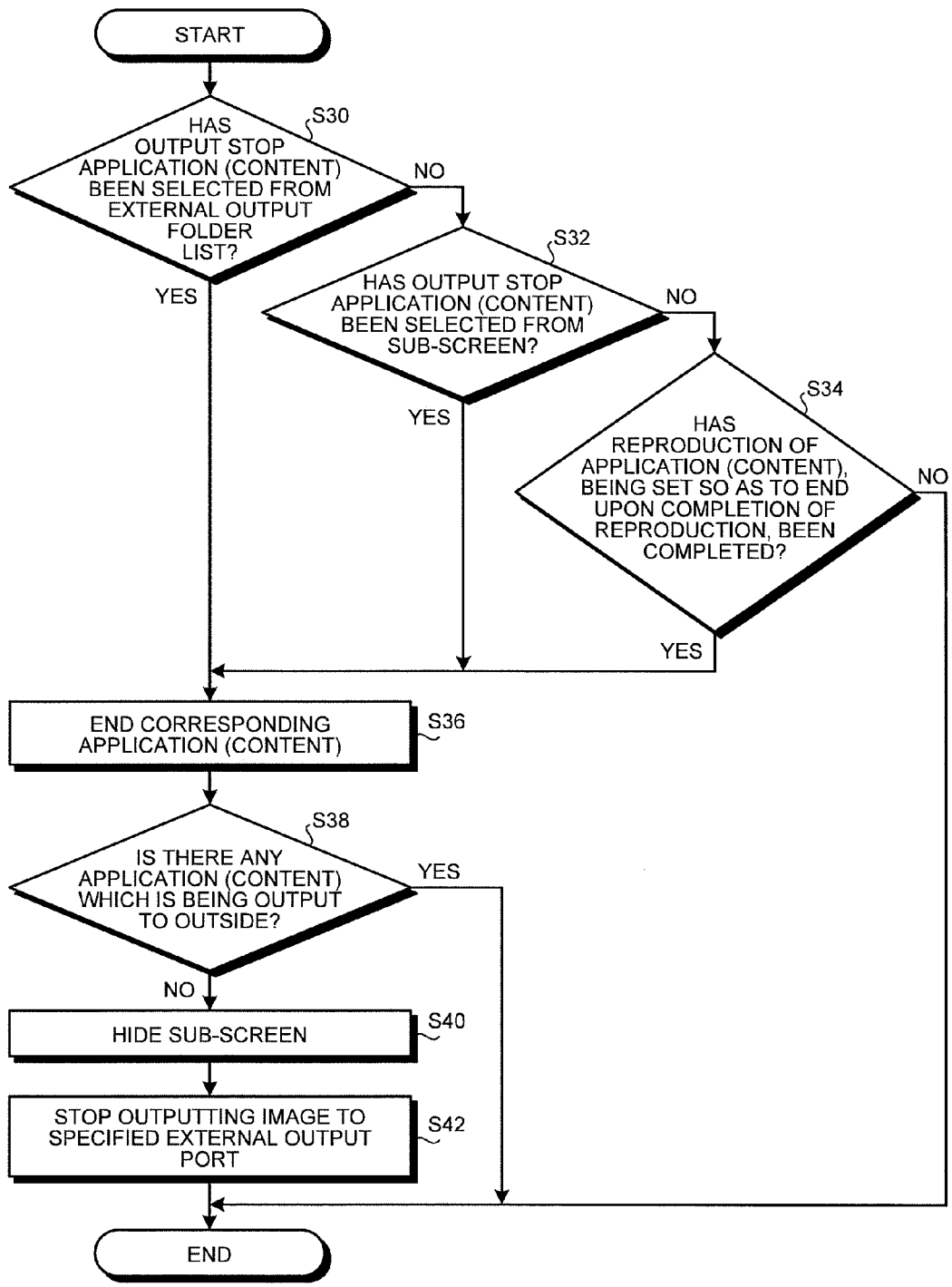
FIG. 10 is a flowchart illustrating one example of the operation of the display system.
Figure 11:
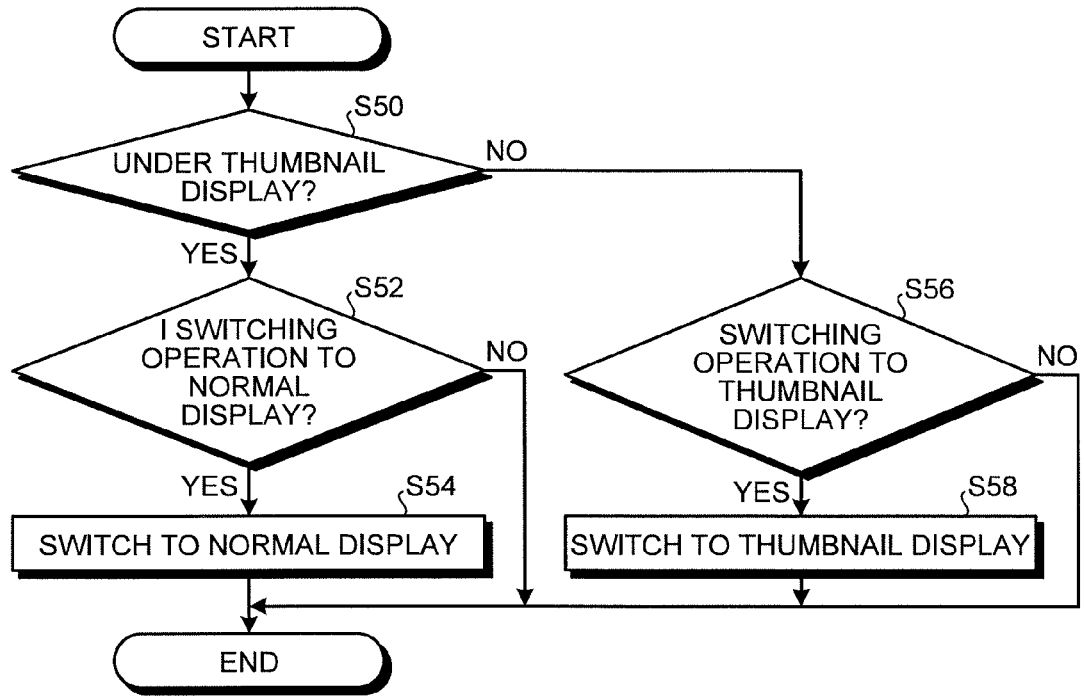
FIG. 11 is a flowchart illustrating one example of the operation of the display system.

The control operation by the control unit 26 of the display system 10 is explained below with reference to FIG. 9 to FIG. 11. FIG. 9 to FIG. 11 are flowcharts illustrating one example of operation of the display system. FIG. 9 is a flowchart of a process when an icon (application or content) is dropped (moved) to the external output folder 42, FIG. 10 is a flowchart of a process while an image is output to the mobile display unit 32, that is, while an external output is performed, and FIG. 11 is a flowchart of a process when the process for switching between images to be displayed on the mobile display unit 32 is input.

First, the processes illustrated in FIG. 9 are explained below. When an icon is moved (dropped) to a display area of the external output folder 42 by an operator's operation, the control unit 26 determines, at Step S10, whether the application or the content dropped into the external output folder, that is, the application or the content for reproducing an image associated with the dropped icon can perform reproduction. In other words, it is determined whether an image is associated with the icon, or whether an application or a content for reproducing the image associated with the icon is available to the control unit 26. When it is determined at Step S10 that the reproduction is impossible (No), that is, that a reproducible image is not associated with the dropped icon, the control unit 26 displays warning, at Step S11. For example, the control unit 26 displays an error massage of "This file cannot be reproduced" on the display unit 22. After the end of the process at Step S11, the control unit 26 ends the process.

When it is determined at Step S10 that the reproduction is possible (Yes), that is, that a reproducible image is associated with the dropped icon, the control unit 26 determines whether the application needs to be activated, at Step S12. Specifically, the control unit 26 determines whether an application needs to be activated newly in order to reproduce an image associated with the icon dropped into the external output folder 42. At Step S12, only the application is described, however, the similar process is performed in case of the content.

When it is determined at Step S12 that the application needs to be activated (Yes), the control unit 26 activates the corresponding application, at Step S14. Thereafter, the control unit 26 decodes an image (data for the image associated with the dropped icon at Step S10) to be reproduced by the activated application. When it is determined at Step S12 that the application does not need to be activated (No), that is, that a required application is already activated or that the process can be performed without activating the application, the control unit 26 decodes data for the image inside of the external output folder 42, at Step S16. The already activated application or process function is used for decoding.

When the process at Step S14 or Step S16 is ended, the control unit 26 determines whether there is any application (content) which is being output to the outside, at Step S18. That is, the control unit 26 determines whether there is an image (that is, an image reproduced by activating the application or the content) displayed (corresponding to "output") on the mobile display unit 32 (corresponding to "outside"). When it is determined at Step S18 that there is any application (content) which is being output to the outside (Yes), that is, that an image is displayed on the mobile display unit 32, the control unit 26 sets a thumbnail display, at Step S20. In other words, as illustrated in FIG. 5 and FIG. 6, the control unit 26 sets such that images caused by a plurality of icons (applications or contents) are displayed on the mobile display unit 32, and generates image signals. When it is determined at Step S18 that there is no application (content) which is being output to the outside (No), that is, that an image is not displayed on the mobile display unit 32, the control unit 26 sets a normal display, at Step S22. In other words, as illustrated in FIG. 4, the control unit 26 sets such that only the image decoded at Step S14 or Step S16 is displayed on the mobile display unit 32.

After the end of the process at Step S20 or Step S22, the control unit 26 determines whether the sub-screen is being displayed, at Step S24. That is, it is determined whether the window 44 is displayed on the display unit 22. When it is determined at Step S24 that the sub-screen is being displayed (Yes), the control unit 26 proceeds to Step S28. When it is determined at Step S24 that the sub-screen is not displayed (No), the control unit 26 displays a new sub-screen (window) on the display unit 22, at Step S26.

When it is determined as Yes at Step S24 or when the process at Step S26 is ended, the control unit 26 outputs the image to a specified external output port, at Step S28. That is, the control unit 26 sends the generated image to the mobile electronic device 14 through the external communication unit 30 and the communication line 16. Thereby, the image sent from the control unit 26 is displayed on the mobile display unit 32 of the mobile electronic device 14. The control unit 26 displays the same image in the sub-screen of the display unit 22, that is, in the window 44. After the end of the process at Step S28, the control unit 26 ends the process. The control unit 26 repeats the processes each time an icon is moved to the external output folder 42.

Next, the processes illustrated in FIG. 10 are explained. The control unit 26 performs the processes illustrated in FIG. 10 while the image is displayed on the mobile display unit 32. First, the control unit 26 determines whether an output stop application (content) has been selected from an external output folder list, at Step S30. That is, the control unit 26 determines whether an operation to stop the application (content) of displaying an image has been input through an operation menu of the external output folder 42 by an operator's operation. When it is determined at Step S30 that the output stop application (content) has been selected (Yes), the control unit 26 proceeds to Step S36.

When it is determined at Step S30 that the output stop application (content) has not been selected (No), the control unit 26 determines whether the output stop application (content) has been selected from the sub-screen (window), at Step S32. That is, the control unit 26 determines whether an operation to stop the application (content) of displaying the image in the window 44 and the mobile display unit 32 has been input through the operation of the window 44 by the operator. When it is determined at Step S32 that the output stop application (content) has been selected (Yes), the control unit 26 proceeds to Step S36.

When it is determined at Step S32 that the output stop application (content) has not been selected (No), the control unit 26 determines whether reproduction of an application (content), being set so as to end upon completion of reproduction, has been completed, at Step S34. When it is determined at Step S34 that the reproduction has been completed (Yes), the control unit 26 proceeds to Step S36. When it is determined at Step S34 that the reproduction has not been completed (No), the control unit 26 ends the process and continues the display of the image on the mobile display unit 32.

When it is determined as Yes at Steps S30, S32, or S34, the control unit 26 ends the corresponding application (content), at Step S36. That is, the control unit 26 ends the display of the image according to the application (content) for which the end instruction is input at Step S30 or Step S32, at Step S36. Alternatively, the control unit 26 ends the display of the application (content) determined at Step S34 that the reproduction has been completed, at Step S36.

After the end of the process at Step S36, the control unit 26 determines whether there is any application (content) which is being output to the outside, at Step S38. That is, the control unit 26 determines whether any application (content) other than the application (content) ended at Step S36 is displaying, or set to display, an image on the mobile display unit 32. When it is determined at Step S38 that there is an application (content) which is being output to the outside (Yes), that is, that the image is continuously displayed on the mobile display unit 32, the control unit 26 ends the process.

When it is determined at Step S38 that there is no application which is being output to the outside (Yes), that is, that no application (content) is set to display an image on the mobile display unit 32 is set, the control unit 26 hides the sub-screen, that is, hides the window 44 displayed on the display unit 22, at Step S40, stops the output of the image to the specified external output port, that is, stops the output of image information to the mobile electronic device 14 at Step S42, and ends the process. The display system 10 repeats the processes, to thereby control the display or the non-display of the image on the mobile display unit 32, and control the activation or the stop of the application (content) used to control the above operations.

Next, the processes illustrated in FIG. 11 are explained. When a process of switching between images to be displayed on the mobile display unit 32 is input, the control unit 26 performs the processes illustrated in FIG. 11. The process of switching between images to be displayed on the mobile display unit 32 is a process of switching a thumbnail display (display of a plurality of images) to a normal display (display of one image), or a process of switching the normal display to the thumbnail display. The operation input by the operator includes an addition operation of an image to be displayed (application or the like to be activated), a delete operation, and a change operation from a state where a plurality of images are displayed to a state where one image is displayed, and the like.

First, when it is detected that an operation of switching between displays is input by the operator, the control unit 26 determines whether the mobile display unit 32 is under thumbnail display, at Step S50. When it is determined at Step S50 that the mobile display unit 32 is under thumbnail display (Yes), the control unit 26 determines whether the operation is a switching operation to the normal display, at Step S52. That is, the control unit 26 determines whether the operation of switching the display of the mobile display unit 32 from the thumbnail display to the normal display has been input, at Step S52. When it is determined at Step S52 that the operation is the switching operation to the normal display (Yes), the control unit 26 switches the display of the mobile display unit 32 to the normal display at Step S54, and ends the process.

When it is determined at Step S52 that the operation is not the switching operation to the normal display (No), the control unit 26 ends the process as it is.

When it is determined at Step S50 that the mobile display unit 32 is not under thumbnail display (No), the control unit 26 determines whether the operation is a switching operation to the thumbnail display, at Step S56. That is, the control unit 26 determines whether the operation of switching the display of the mobile display unit 32 from the normal display to the thumbnail display has been input, at Step S56. When it is determined at Step S56 that the operation is the switching operation to the thumbnail display (Yes), the control unit 26 switches the display of the mobile display unit 32 to the thumbnail display at Step S58, and ends the process. When it is determined at Step S56 that the operation is not the switching operation to the thumbnail display (No), the control unit 26 ends the process as it is. The display system 10 performs the processes, and can thereby switch between the displays of the mobile display unit 32.

Figure 12:
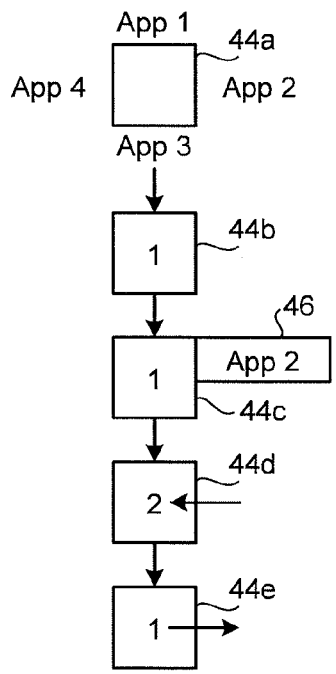
FIG. 12 is an explanatory diagram for explaining another example of an image to be displayed on the display unit of the display system.

According to the embodiment, the same image as the image displayed on the mobile display unit 32 is displayed in the window 44 of the display unit 22; however, various displays and processing functions can be added to the display unit 22 and the window 44. Another example of the window 44 is explained below with reference to FIG. 12. FIG. 12 is an explanatory diagram for explaining another example of an image to be displayed on the display unit of the display system. FIG. 12 is a diagram representing only a portion, related to the window, of the display unit 22, and the display is switched from a window 44a to a window 44e through each operation.

As illustrated in FIG. 12, the window 44a is a square window, and an App (which is an abbreviation for application) 1 is assigned to an upper side in the figure, an App 2 to a right side therein, an App 3 to a lower side therein, and an App 4 to a left side therein. The operator specifies each of the sides of the window 44a and performs an operation, so that the operator can operate an image to be displayed in the window 44a and an image to be displayed on the mobile display unit 32. Which of the Apps is assigned to which of the sides of the window 44a, whether an App is not assigned, or the like can be set by an operator's operation.

When the operator performs an operation for displaying the App 1 from the state of the window 44a illustrated in FIG. 12, an image corresponding to the App 1 appears inside of a window 44b as illustrated in the window 44b.

Subsequently, when the operator performs operation of putting an operation cursor on the right side of the window, from the state illustrated in the window 44b, for a preset time period or longer, a call-out 46 of the App 2 is displayed as illustrated in a window 44c. As the call-out 46, text (e.g., data name) related to the image of the App 2, a reduced image, or the like is displayed.

When the operator inputs an operation of moving the cursor to the inside of the window from the state illustrated in the window 44c, the control unit 26 determines that an instruction to switch between the displays is input and switches an App used to display an image inside the window from the App 1 to the App 2, as illustrated in a window 44d. The display switching instruction is not limited thereto, and therefore, an input of a predetermined operation (e.g., double click) on the right side and an operation to specify the right side and to drag and drop the App to the inside of the window may be set as a switching operation.

When the operator inputs an operation to move the cursor from the inside of the window to the outside thereof in such a manner that the cursor passes through the right side from the state illustrated in the window 44*d*, the control unit 26 determines that an instruction to end the display of the image of the App 2 is input, ends the display of the App 2 inside of the window, and displays the App 1 as illustrated in the window 44*e*.

In this manner, the display system 10 associates Apps (images thereof) with the periphery of the window, for example, with the sides of the outer periphery thereof, to enable easy switching between images to be displayed on the mobile display unit 32. Moreover, by displaying a reduced image or data of the App associated with (assigned to) each of the sides, an image to be displayed on the mobile display unit 32 can be easily selected. In addition, an unintended image can be prevented from being displayed on the mobile display unit 32.

A display status of each of the sides, specifically, a color to be displayed, a thickness of a line, a type of the line (dotted line, solid line), a display mode (flickering, always displayed, always non-displayed) or the like is preferably switched according to whether an image of the associated (that is, registered) App is displayed in the window or the mobile display unit 32, whether any App is associated with each of the sides, a type of the associated App, or the like. This enables the operator to visually check the status of each of the sides, thus more improving the operability.

Figure 13:
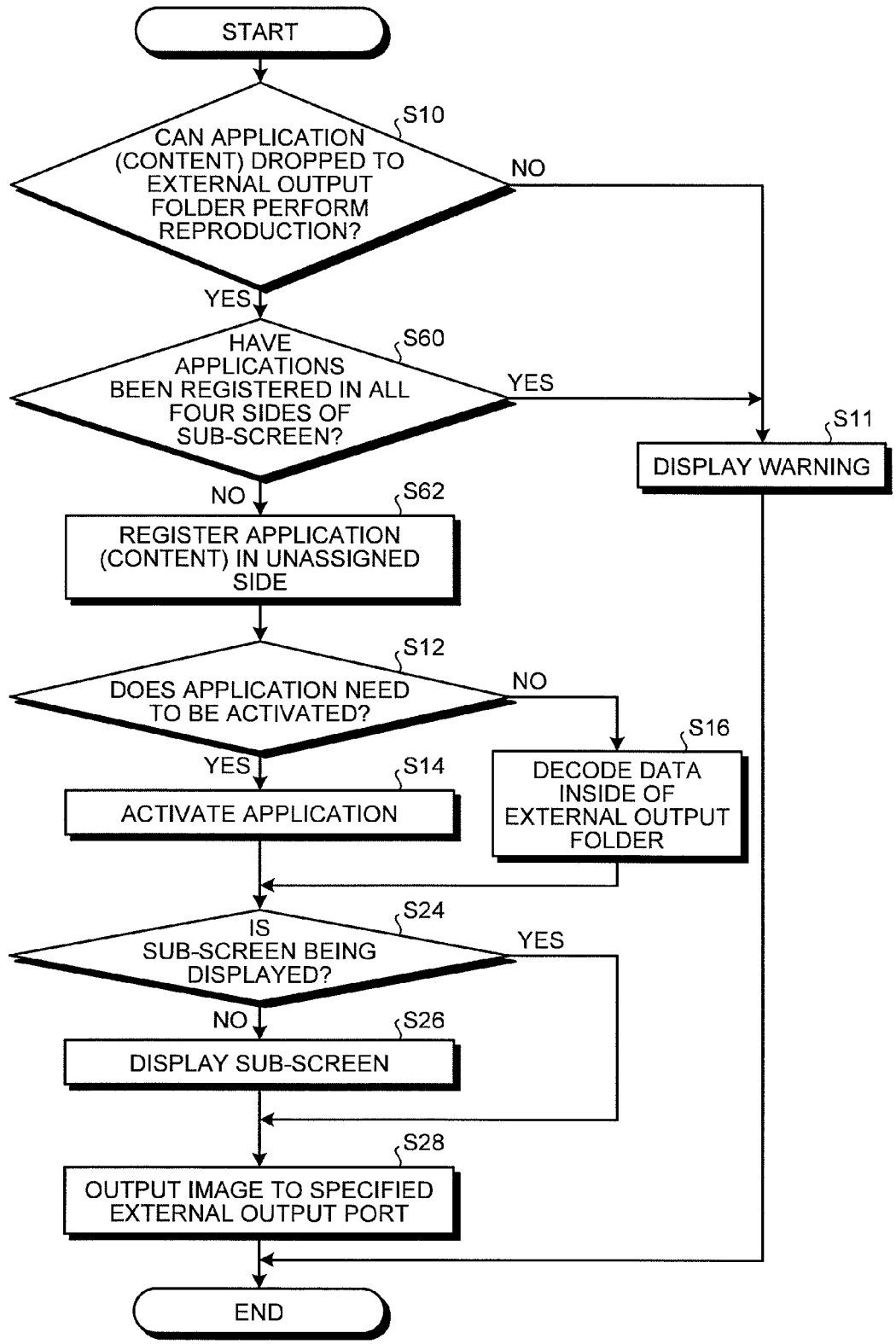
FIG. 13 is a flowchart illustrating one example of the operation of the display system.
Figure 14:
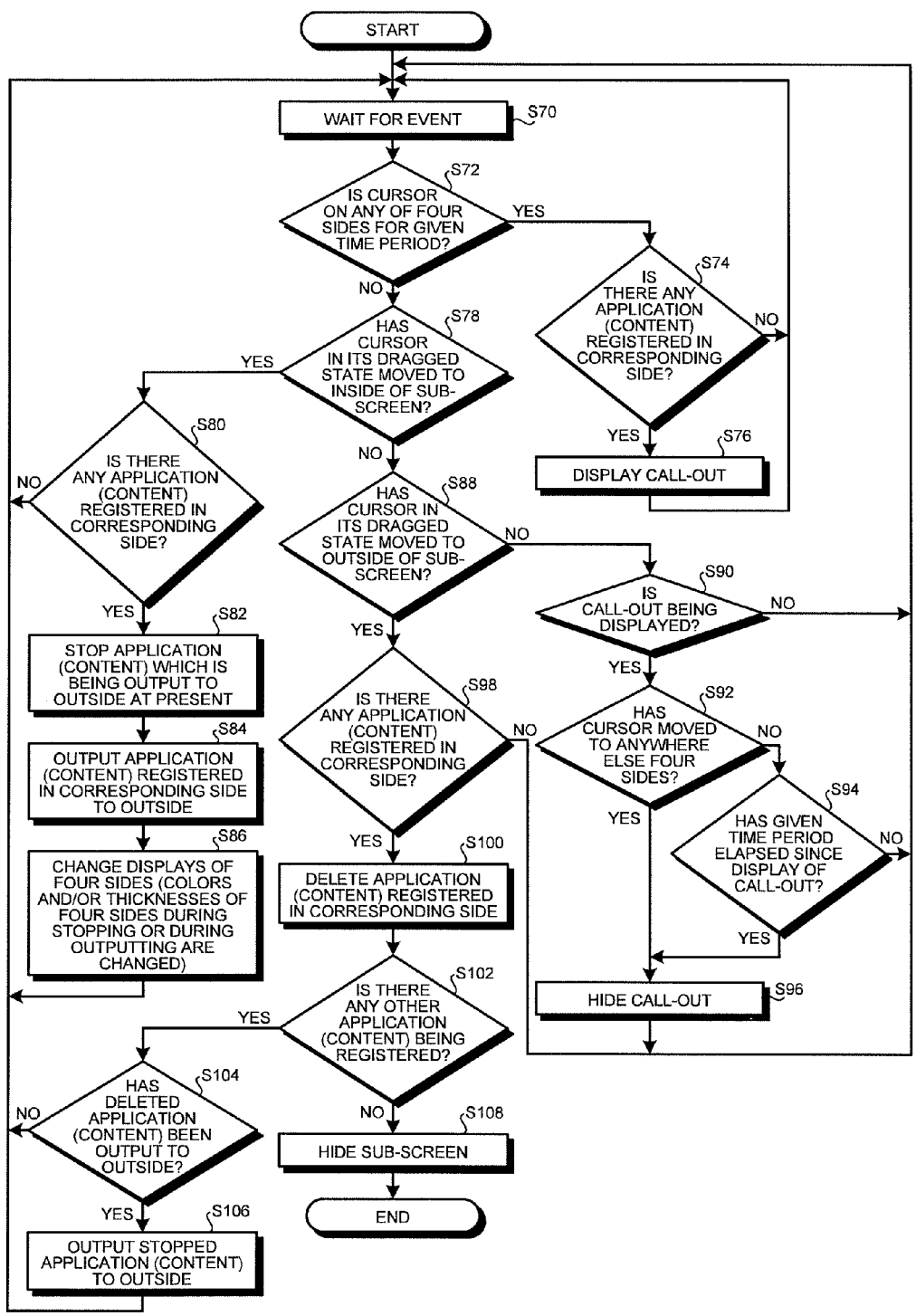
FIG. 14 is a flowchart illustrating one example of the operation of the display system.
Figure 15:
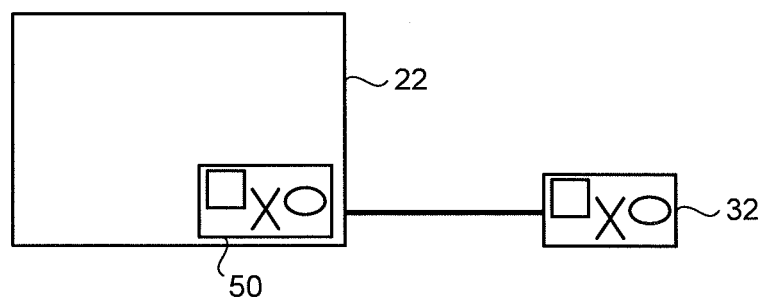
FIG. 15 is an explanatory diagram for explaining an image to be displayed on the display system.

The control operation performed by the control unit 26 of the display system 10 is explained below with reference to FIG. 13 and FIG. 14. FIG. 13 and FIG. 14 are flowcharts illustrating one example of an operation of the display system. FIG. 13 is a flowchart of a process when an icon (application or content) is dropped (moved) to the external output folder 42, and FIG. 14 is a flowchart of a process while the window is displayed.

First, the processes illustrated in FIG. 13 are explained below. In the example of FIG. 13, the window is displayed. When an icon is moved (dropped) to a display area of the external output folder 42 by an operator's operation, the control unit 26 determines, at Step S10, whether the application or the content dropped into the external output folder 42, that is, the application or the content for reproducing an image associated with the dropped icon can perform reproduction. When it is determined at Step S10 whether the reproduction is impossible (No), the control unit 26 displays warning, at Step S11. After the end of the process at Step S11, the control unit 26 ends the process.

When it is determined at Step S10 that the reproduction is possible (Yes), the control unit 26 determines whether applications have been registered in all the four sides of the sub-screen, at Step S60. That is, the control unit 26 determines whether Apps are associated with all the four sides of the window. When it is determined at Step S60 that Apps are associated with all the four sides of the window (Yes), the control unit 26 determines that it is impossible to reproduce the dropped application (content), and proceeds to Step S11. As a message displayed at Step S11 in this case, a message indicating that there is no space for the App is preferably displayed.

When it is determined at Step S60 that Apps are not associated with all the four sides of the window (No), that is, that no App is associated with at least one of the four sides and the association is possible, the control unit 26 registers the application (content) in an unassigned side, at Step S62. That is, the control unit 26 associates the application (content), which is associated with the icon dropped at Step S10, with the side with which no application is associated.

After the end of the process at Step S62, the control unit 26 determines whether the application needs to be activated, at Step S12. When it is determined at Step S12 that the application needs to be activated (Yes), the control unit 26 activates the corresponding application, at Step S14. Thereafter, the control unit 26 decodes an image to be reproduced by the activated application. When it is determined at Step S12 that the application does not need to be activated (No), the control unit 26 decodes the image inside of the external output folder 42, at Step S16.

When the process at Step S14 or Step S16 is ended, the control unit 26 determines whether the sub-screen is being displayed, at Step S24. That is, it is determined whether the window is displayed on the display unit 22. When it is determined at Step S24 that the sub-screen is being displayed (Yes), the control unit 26 proceeds to Step S28. When it is determined at Step S24 that the sub-screen is not displayed (No), the control unit 26 displays a new sub-screen (window) on the display unit 22, at Step S26.

When it is determined as Yes at Step S24 or when the process at Step S26 is ended, the control unit 26 outputs the image to a specified external output port, at Step S28. That is, the control unit 26 sends the generated image to the mobile electronic device 14 through the external communication unit 30 and the communication line 16. Thereby, the image sent from the control unit 26 is displayed on the mobile display unit 32 of the mobile electronic device 14. The control unit 26 displays the same image in the sub-screen of the display unit 22, that is, in the window 44. After the end of the process at Step S28, the control unit 26 ends the process. The control unit 26 repeats the processes each time an icon is moved to the external output folder 42.

Next, the processes illustrated in FIG. 14 are explained. The control unit 26 performs the processes of FIG. 14 while the window is displayed. First, the control unit 26 waits for an event, at Step S70, and proceeds to Step S72 when event occurrence (basically, an operation by the operator) is detected.

The control unit 26 determines whether the cursor is on any of the four sides for a given time period, at Step S72. That is, the control unit 26 determines whether the cursor operated by the operator is on any one of the four sides for a given time period or longer. When it is determined at Step S72 that the cursor is on any of the four sides for the given time period (Yes), the control unit 26 determines whether there is any application (content) registered in the corresponding side, that is, in the side on which the cursor is put, at Step S74. When it is determined that the application (content) is registered (Yes), the control unit 26 displays the registered application (content) as a call-out, at Step S76, and proceeds to Step S70. That is, the control unit 26 displays the information for the application (content), as a call-out, registered in the side which the cursor overlaps, and thereafter, again waits for an event. When it is determined at Step S74 that the application (content) is not registered (No), the control unit 26 proceeds to Step S70, and waits for an event.

When it is determined at Step S72 that the cursor is not on any of the four sides for the given time period (No), the control unit 26 determines whether the cursor in its dragged state has moved to the inside of the sub-screen (window), at Step S78. Specifically, it is determined whether the cursor passes through an arbitrary side from the outside of the window to be moved into the inside thereof while maintaining the dragged state of the cursor. When it is determined at Step S78 that the cursor in its dragged state has moved to the inside of the sub-screen (window) (Yes), the control unit 26 determines whether there is any application (content) registered in the side, that is, in the side through which the cursor passes, at Step S80. When it is determined at Step S80 that the application (content) is not registered, the control unit 26 proceeds to Step S70, and waits for an event.

When it is determined at Step S80 that the application (content) is registered (Yes), the control unit 26 stops the application (content) which is being output to the outside at present, at Step S82. That is, the control unit 26 stops the application (content) displayed on the mobile display unit 32. Thereafter, the control unit 26 outputs the application (content) registered in the corresponding side to the outside, at Step S84. That is, the control unit 26 displays the image of the application (content) registered in the side through which the cursor has passed on the mobile display unit 32. Thereafter, the control unit 26 changes the displays of the four sides, at Step S86. Specifically, the control unit 26 changes the colors and/or the thicknesses used for displaying the side corresponding to the App with which the display of the image is stopped in the window at Step S82 and the side corresponding to the App with which the image is displayed in the window at Step S84 among the four sides of the window, based on the settings. Thereafter, the control unit 26 proceeds to Step S70, and waits for an event.

When it is determined at Step S78 that the cursor in its dragged state has not moved to the inside of the sub-screen (window) (No), the control unit 26 determines whether the cursor in its dragged state has moved to the outside of the sub-screen (window), at Step S88. Specifically, the control unit 26 determines whether the cursor passes through an arbitrary side from the inside of the window to the outside thereof while maintaining the dragged state of the cursor. When it is determined at Step S88 that the cursor in its dragged state has not moved to the outside of the sub-screen (window) (No), the control unit 26 determines whether a call-out is being displayed, at Step S90. When it is determined at Step S90 that the call-out is not being displayed (No), the control unit 26 proceeds to Step S70, and waits for an event.

When it is determined at Step S90 that the call-out is being displayed (Yes), the control unit 26 determines whether the cursor has moved to anywhere else the four sides, at Step S92. When it is determined at Step S92 that the cursor has moved to anywhere else of the four sides (Yes), that is, that the cursor has moved up to an area determined that the cursor is not on any of the four sides, the control unit 26 proceeds to Step S96. When it is determined at Step S92 that the cursor has not moved to anywhere else the four sides (No), that is, that the cursor is on any of the four sides, the control unit 26 determines whether a given time period has elapsed since the display of the call-out, at Step S94. When it is determined at Step S94 that the given time period has not elapsed since the display of the call-out (No), the control unit 26 proceeds to Step S70, and waits for an event. That is, the call-out remains displayed.

When it is determined at Step S92 that the cursor has moved to anywhere else the four sides (Yes) or when it is determined at Step S94 that the given time period has elapsed (Yes), the control unit 26 switches the call-out to the non-display at Step S96, proceeds to Step S70, and waits for an event.

When it is determined at Step S88 that the cursor in its dragged state has moved to the outside of the sub-screen (window) (Yes), the control unit 26 determines whether there is any application (content) registered in the corresponding side, that is, in the side through which the cursor has passed, at Step S98. When it is determined at Step S98 that no application (content) has been registered therein (No), the control unit 26 proceeds to Step S70, and waits for an event.

When it is determined at Step S98 that the application (content) has been registered therein (Yes), the control unit 26 deletes the application (content) registered in the corresponding side, at Step S100. That is, the control unit 26 resolves the association between the registered application (content) and the side. Thereafter, the control unit 26 determines whether there is any other application (content) being registered, at Step S102. That is, the control unit 26 determines whether there is any other application (content) that is registered in any of the four sides.

When it is determined at Step S102 that there is any registered application (content) (Yes), the control unit 26 determines, at Step S104, whether the deleted application (content) has been output to the outside, that is, whether it is an App displayed in the window and the mobile display unit 32. When it is determined at Step S104 that the application has not been output to the outside (No), the control unit 26 proceeds to Step S70, and waits for an event.

When it is determined at Step S104 that the application has been output to the outside (Yes), the control unit 26 outputs the stopped application (content) to the outside, at Step S106. That is, to reproduce the App deleted at Step S100, the control unit 26 displays the stopped App in the window and the mobile display unit 32. If an App to be reproduced is not set, the display of the image may be stopped. After the external output at Step S106, the control unit 26 proceeds to Step S70, and waits for an event.

When it is determined at Step S102 that there is no registered application (content) (No), the control unit 26 hides the sub-screen (window) at Step S108, and ends the process.

The display system 10 associates the four sides of the window with Apps and switches between images to be displayed on the mobile display unit in the above manner, so that displays can be switched from one to the other by simpler operation.

According to the embodiment, one application (content) is associated with each of the four sides of the window; however, the association is not limited thereto. For example, one side is divided into a plurality of ranges, and each of the ranges may be associated with an application (content). Moreover, the window is formed to a polygonal shape, and the number of sides may be increased according to the number of applications (contents).

One image may be associated with an application (content). That is, it may be configured to drive one application (content) corresponding to one image; however, a plurality of images which can be reproduced by the same application (content) may be driven by one application (content). In this case, an image to be reproduced is simply selected from among the images by operation of the application (content). A start or a stop of reproduction may be operated for each image.

According to the embodiment, the application or the content for reproducing an image is set to one type; however, an image reproducible by a plurality of applications can be used. For example, there is a plurality of pieces of software as moving-image reproduction software, image reproduction software, and the like, and various types of application software can be selected according to an intended use. In this case, an image may be reproduced by a preset application; however, it is preferable that an application or a content to be used can be selected before reproduction. This enables option for the operator to be widened. In this case, it is preferable to display applications as candidates for use, as icons, in the external output folder or around the window (that is, folder icon) and to enable the operator to select one. When it is detected that the operator clicks (selects) an icon of an application to be used and moves the icon onto the external output folder or onto the window, the control unit uses the selected application to generate an image, and displays the image on the mobile display unit. It is preferable to select an application when the icon is moved to the external output folder or to the window, or when an instruction for reproduction is input to the icon. Candidates of an application to be used may be displayed as icons around the icon associated with the image to be reproduced, so that the same control may be performed.

When image information stored in an external storage unit is used as an image to be reproduced using a communication line, for example, when an image acquired from a server using an Internet line is to be displayed, the display system 10 preferably store the acquired image information in the storage unit 28 while performing the display process of the image. As a result, there is no need to again acquire an image from the outside when the same image is reproduced, and this enables to reduce an amount of information to be processed, thus achieving quick image reproduction.

Next, the operation of the window of the display system 10 is explained with reference to FIG. 15 to FIG. 18. FIG. 15 to FIG. 18 are explanatory diagrams for explaining an image to be displayed on the display system. According to the present embodiment, the control unit 26 displays a display frame 50 at an outer periphery of an area (window), out of an image displayed in the PC 12, displayed also on the mobile display unit 32. That is, out of the image displayed on the display unit 22, the control unit 26 basically displays an image in the area surrounded by the display frame 50 on the mobile display unit 32. The example of FIG. 15 assumes a case where a whole image in one window is displayed in the display frame 50. Therefore, outer edges of the image overlap the display frame 50.

The display system 10 can change a size and a position of a display frame of the window, that is, a proportion of the display frame 50 occupying the display unit 22 and the position of the display frame 50 in the display unit 22. A relation between the image and the display frame 50 displayed in the window can also be changed if necessary. The display system 10 can control an image to be displayed on the mobile display unit 32 by controlling the display frame 50 and the window displayed in the display unit 22.

Figure 16:
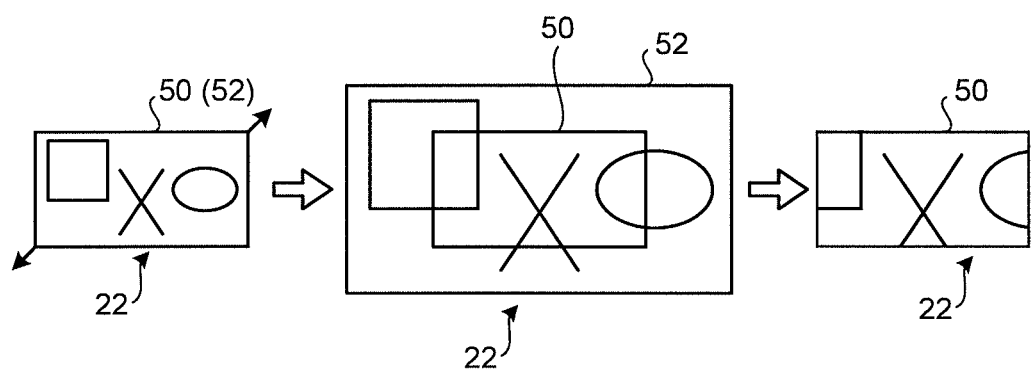
FIG. 16 is an explanatory diagram for explaining an image to be displayed on the display system.

The relation will be specifically explained below with reference to FIG. 16 to FIG. 18. First, as illustrated in the left side of FIG. 16, an image surrounded by the display frame 50 is displayed in part of the display unit 22. That is, the image is displayed as illustrated in the display unit 22 of FIG. 15. As explained above, an image frame 52 indicating an outer edge of the image (image of App) displayed in the window overlaps the display frame 50. The same image is also displayed on the mobile display unit 32. In this state, the operator performs an operation of enlarging only the image frame 52 in the window, as illustrated in the figure at the center of FIG. 16. According to the present embodiment, out of the image displayed in the window, a portion of the image on the outside of the display frame 50 is also displayed when the image is operated. By performing the operation of enlarging only the image frame 52 in the above manner, the image displayed in the window is enlarged and displayed in accordance with the image frame 52, and as illustrated in the figure on the right side of FIG. 16, only the portion of the image in the image frame 52 is in the display frame 50. Thereby, only the portion of the image surrounded by the display frame 50, out of the image in the image frame 52, is also displayed on the mobile display unit 32.

Figure 17:
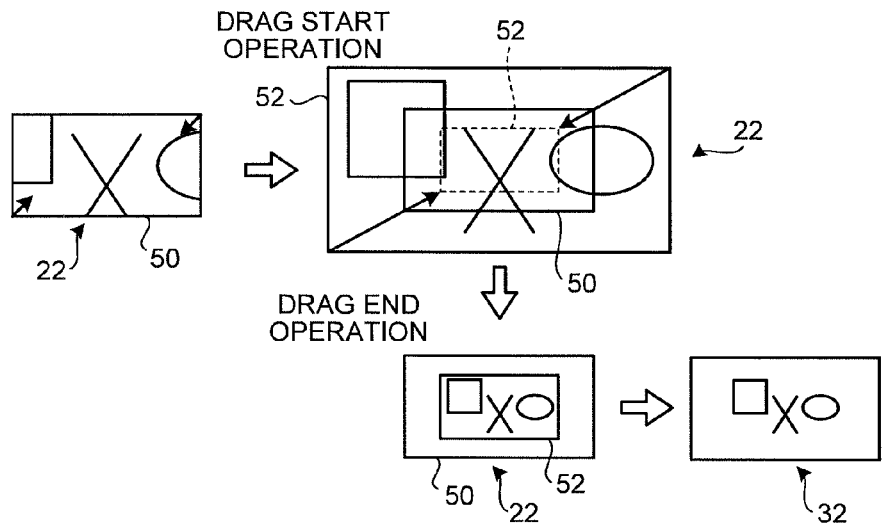
FIG. 17 is an explanatory diagram for explaining an image to be displayed on the display system.

Next, as illustrated in the figure on the upper left side of FIG. 17, an operation of reducing the image frame 52 is performed from the state where only the portion of the image surrounded by the display frame 50 in the image is displayed (that is, the state indicated in the figure on the right side of FIG. 16) to smaller one than the display frame 50 as illustrated in the upper figure at the center of FIG. 17. That is, the image frame 52 is changed from the size and position indicated by a solid line to the size and the position indicated by a dotted line as illustrated in the upper side at the center of FIG. 17. The size and the position of the image frame 52 can be changed by the drag-and-drop operation. During the operation of the image, the image outside of the display frame 50 and the image frame 52 of the image are also displayed on the display unit 22 as illustrated in the upper figure at the center of FIG. 17. In this manner, if the image frame 52 is changed up to the position and the size indicated by the dotted line, the image frame 52 is made smaller than the display frame 50 as illustrated in the lower figure at the center of FIG. 17, and the image outside of the image frame 52 of the display unit 22 and inside of the display frame 50 is displayed on the mobile display unit 32 as well as the image in the image frame 52, as illustrated in the figure on the lower right side of FIG. 17. As illustrated in FIG. 17, because setting not to display the image frame 52 is made on the mobile display unit 32, the image frame 52 is not displayed thereon.

Figure 18:
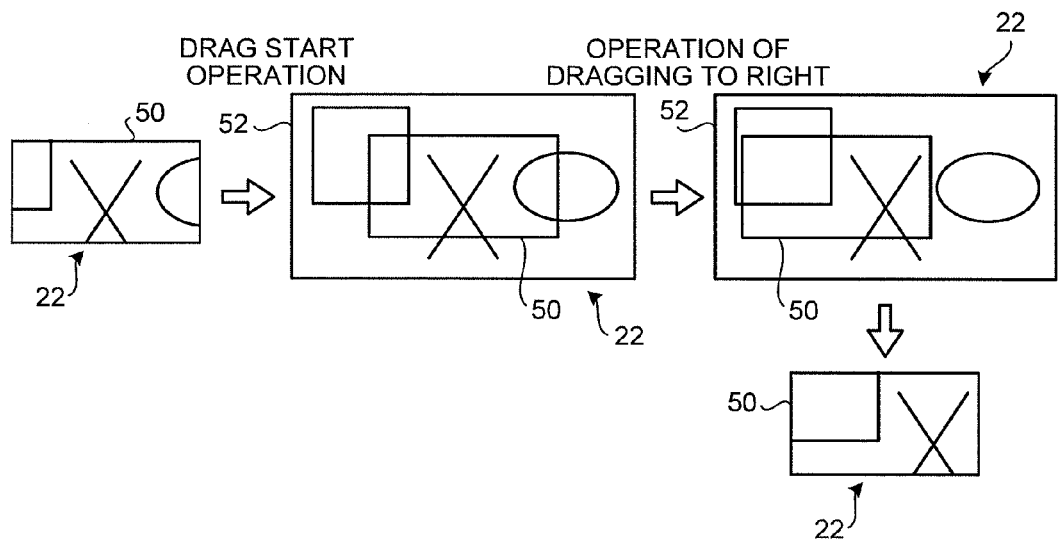
FIG. 18 is an explanatory diagram for explaining an image to be displayed on the display system.

Next, the image frame 52 is displayed as illustrated in the figure at the center of FIG. 18 from the state where only the portion of the image surrounded by the display frame 50 in the image (that is, the state indicated in the figure on the right side of FIG. 16) are displayed as illustrated in the figure on the left side of FIG. 18, and then, a relative position between the display frame 50 and the image frame 52 is moved, as illustrated in the figure on the upper right side of FIG. 18. Specifically, the image frame 52 is dragged to the right side. Thereby, the relative position between the display frame 50 and the image frame 52 is changed, and a portion of the image different from the left figure in FIG. 18, out of the image in the image frame 52, can be displayed inside of the display frame 50, as illustrated in the figure on the lower right side of FIG. 18.

In this manner, the display frame 50 and the image frame 52 are relatively operated to operate the image in the window, so that a more appropriate image can be displayed on the mobile display unit 32. The operator can perform operations while checking only the image on the display unit 22.

The cases where one image is enlarged, reduced, and moved with respect to the display frame have been explained with reference to FIG. 16 to FIG. 18; however, the present invention is not limited thereto, and thus various operations can be preformed on the display frame and the window.

The display system 10 may display an image in the display frame by using the full screen of the mobile display unit regardless of the size of the display frame. That is, the image in the display frame may be full-screen displayed in the mobile display unit. In this case, if the shape (aspect ratio) of the display frame is different from the shape of the screen of the mobile display unit, the control unit performs processes such as enlargement and compression on an image in the display frame and displays the image. An image may be displayed on the mobile display unit according to the pixels or the size of the image displayed on the display unit. That is, the image in the display frame may be displayed on the mobile display unit as it is. In this case, if the shape (aspect ratio) of the display frame is different from the shape of the screen of the mobile display unit, the image is not displayed in part of the screen of the mobile display unit.

According to the embodiment, the display frame is formed to a rectangle, however, the size and the shape of the display frame can be formed to various shapes. For example, the display frame can be formed to a shape such as a square shape, a disc shape, a star shape, a heart shape, and an arbitrary shape.

When the operation of any one of the display frame and the window in the display frame or both is not performed for a set time period, the display system may set the window of the display unit to non-display. By hiding the window when the operation is not performed, the display area of the display unit can be effectively used.

According to the embodiment, the display system is configured to display the two on the display unit: the external output folder into which an icon is dropped and the window for displaying an image to be displayed on the mobile display unit; however, the function of the external output folder and the function of the window may be combined into one. That is, a single window may have a function of displaying an image to be displayed on the mobile display unit and a function of specifying an icon to be displayed on the mobile display unit. The window may be displayed by an operator's operation, or the external output folder may be changed to the window when an icon is dropped into the external output folder.

The display system may store information for the image displayed on the mobile display unit in the storage unit. The storage unit may store therein all the displayed images; however, it is preferable to store images specified by the operator's operation. In this manner, by storing the images displayed on the mobile display unit, a history of the images displayed on the mobile display unit can be left. In addition, an image displayed in combination with images in a plurality of windows can be stored, and therefore the image created by the operator can be left. In this case, any one of information for the shape of the display frame and information for the shape of the image (image in the display frame) displayed on the mobile display unit or both are preferably stored in association with the image. In this manner, by storing any one of the shape of the display frame and the shape of the stored image or both, images of various shapes can be stored and reproduced, and the created image can be displayed again with its outer shape being kept as it is.

According to the embodiment, for the display unit in the display system, the display unit of PC is used as one of the display units (second display unit), and the mobile display unit of the mobile electronic device is used as the other display unit (first display unit); however, the present invention is not limited thereto. As one of the display units, various display units viewed by the operator upon operation, for example, the display unit of the mobile electronic device can be used. As the other display unit, the display unit of PC, various types of display panel, a projector, or the like can be used.

Industrial Applicability

As explained above, the display system according to the present invention is suitable to be used for an electronic device that displays different images on two display units.

The invention claimed is:

1. A display system, comprising:
a first display unit configured to display a first image;
a second display unit configured to display a second image including a file icon associated with image information and a folder icon displayed in an area different from that of the file icon before the first image is displayed on the first display unit;
an operating unit configured to operate a display position of at least one of the file icon and the folder icon on the second display unit; and
a control unit configured to control the first display unit and the second display unit, wherein
the control unit is configured to, when an operation to move at least one of the file icon and the folder icon so as to overlap each other is input to the operating unit, cause the first display unit to automatically display, without further manipulation on the first display unit, an image of the image information associated with the file icon, and
the first and second display units are physically separate from each other.

2. The display system according to claim 1, wherein the control unit is configured to activate an application function corresponding to a file type of the file icon to generate the image from the image information associated with the file icon by the activated application function.

3. The display system according to claim 2, wherein, the control unit is configured to cause the first display unit to display, when it is determined by the control unit that there is a plurality of application functions corresponding to the file type of the file icon, application icons corresponding to the plurality of application functions around the folder icon, and
the control unit is configured to activate, when an operation to select one application icon from the plurality of application icons is detected, the one application function to generate the image from the image information associated with the file icon by the activated application function.

4. The display system according to claim 3, wherein the operation for the selection is an operation to move the one application icon, of the plurality of application icons, onto the folder icon.

5. The display system according to claim 1, wherein the control unit is configured to cause the second display unit to display, when the first image is displayed on the first display unit, a same image as the image displayed on the first display unit in a part of the second display unit.

6. The display system according to claim 5, wherein the control unit is configured to cause the second display unit to display the same image as the image displayed on the first display unit inside an area of the second display unit where the folder icon is displayed.

7. The display system according to claim 5, wherein the control unit is configured to cause the second display unit to display the same image as the image displayed on the first display unit in an area of the second display unit different from the area where the folder icon is displayed.

8. The display system according to claim 1, wherein the control unit is configured to cause the first display unit to display, when an instruction to display images associated with a plurality of file icons is input through the operating unit, the images associated with the plurality of file icons, as thumbnail images.

9. The display system according to claim 1, further comprising an external storage device provided with a storage unit configured to store information,
wherein when the image information is stored in the external storage device, the control unit is configured to
acquire the image information from the storage unit of the external storage device,
cause the first or second display unit to display the image, and
cause the storage unit to store the image information.

10. The display system according to claim 1, comprising:
a first display device that includes the first display unit; and
a second display device that includes the second display unit, the control unit, and the operating unit, wherein the first display device is removably attachable to the second display device.

11. The display system according to claim 1, wherein the first display unit is a projector.

12. A display system, comprising:
a first display unit;
a second display unit provided with a first icon arranged thereon;
an operating unit configured to detect an operation; and
a control unit, wherein
the first and second display units are physically separate from each other, and
when an operation of moving the first icon to a first area on the second display unit is detected by the operating unit, the control unit is configured to cause (i) the first display unit to automatically display, without further manipulation on the first display unit, a first image associated with the first icon on the first display unit and (ii) the second display unit to display the first image associated with the first icon in a second area on the second display unit.

13. The display system according to claim 12, wherein
the second display unit is further provided with a second icon arranged thereon, and
the control unit is configured to divide, when an operation of moving the second icon to the first area is detected by the operating unit while the first image is displayed on the first display unit and in the second area, a display area of the first display unit and the second area, so that the first image is displayed in one of divided areas on the first display unit and in one of divided areas of the second area, and a second image associated with the second icon is displayed in another of divided areas on the first display unit and in another of divided areas of the second area.

14. The display system according to claim 12, wherein
the control unit is configured to associate the first icon with one of sides of the second area according to an operation detected by the operating unit.

15. The display system according to claim 14, wherein
when an operation for the side of the second area with which the first icon is associated is detected by the operating unit, the control unit is configured to cause the first display unit to display the first image on the first display unit and to cause the second display unit to display the first image in the second area on the second display unit.

16. A method of controlling a display system including a first display unit, a second display unit, and an operating unit, the control method comprising:
displaying a first icon on the second display unit physically separate from the first display unit;
detecting an operation of moving the first icon to a first area on the second display unit by the operating unit; and
automatically displaying, without further manipulation on the first display unit, when the operation is detected, a first image associated with the first icon on the first display unit and in a second area on the second display unit.

* * * * *